No. 837,344. PATENTED DEC. 4, 1906.
C. SCHILLER.
PASTRY CUP BAKEBOARD.
APPLICATION FILED AUG. 1, 1906.

Witnesses
Arthur Gumpe
Ernest Pfennigwerth

Inventor
Carl Schiller
By his Attorney
Frank v. Briesen

UNITED STATES PATENT OFFICE.

CARL SCHILLER, OF NEW YORK, N. Y.

PASTRY-CUP BAKEBOARD.

No. 837,344.

Specification of Letters Patent.

Patented Dec. 4, 1906.

Application filed August 1, 1906. Serial No. 328,670.

*To all whom it may concern:*

Be it known that I, CARL SCHILLER, a citizen of Germany, residing at New York city, Brooklyn, county of Kings, State of New York, have invented new and useful Improvements in Pastry-Cup Bakeboards, of which the following is a specification.

This invention relates to an improved board for baking pastry-cups such as used for receiving a filling of ice-cream, whipped cream, or a similar matter.

Figure 1:
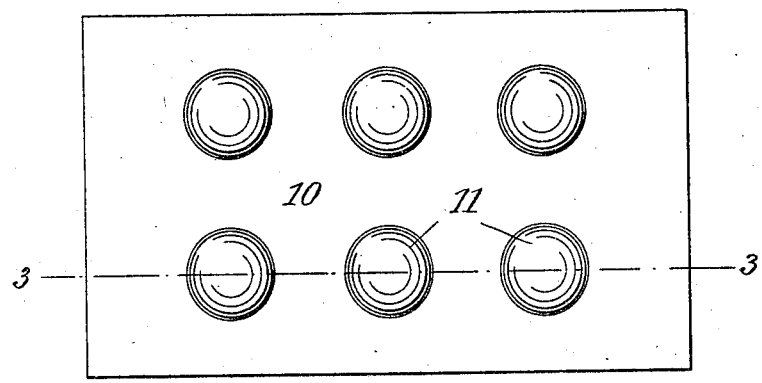
Figure 2:
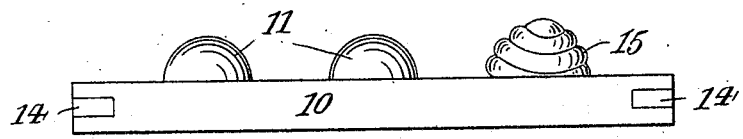
Figure 3:
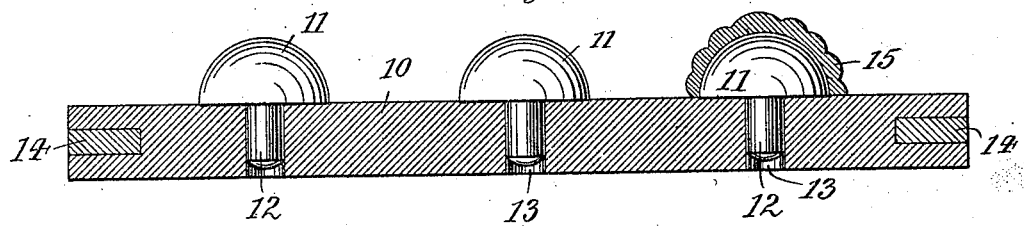

In the accompanying drawings, Figure 1 is a top view of my improved board for baking pastry-cups, Fig. 2 an end view thereof, and Fig. 3 a section on line 3 3, Fig. 1.

From the surface of a flat board 10 project a number of spaced wooden knobs or curved protuberances 11, which are preferably arranged equidistant from each other. Each knob is provided with a depending stem 12, that enters a vertical perforation 13 of board 10 and permits the knob to be readily attached and removed. The knobs are preferably of the semispherical shape shown and correspond in contour and size to the contour and size of the cavities to be formed in the cups. If desired, the ends of the board may be reinforced by transverse strips 14, which extend at right angles to the grain of the board.

The dough is squirted from a pastry-bag separately upon each of the knobs 11 to form the concave spiral shells 15, as shown. The board thus charged is pushed into the oven, where it remains until the cups have been sufficiently baked on the outside. Then the board is withdrawn, the cups are lifted from the knobs, are reversed, and thus reversed are rebaked for a short time. In this way evenly-baked pastry-shells are obtained which are ready for the filling. If the knobs become soiled, they may be readily removed and reattached to the board, while all objectionable metal or adhesive connection is dispensed with.

What I claim is—

A pastry-cup bakeboard having a number of perforations, combined with a series of knobs having stems that removably engage said perforations, substantially as specified.

Signed by me at New York city, Manhattan, N. Y., this 31st day of July, 1906.

CARL SCHILLER.

Witnesses:
FRANK V. BRIESEN,
WILLIAM SCHULZ.